US006605680B1

(12) United States Patent
Donker et al.

(10) Patent No.: US 6,605,680 B1
(45) Date of Patent: Aug. 12, 2003

(54) LOW COLOR, AROMATIC MODIFIED $C_5$ HYDROCARBON RESINS

(75) Inventors: Chretien P. L. C. Donker, Heinkenszand (NL); Ester E. C. G. Gielens, Borssele (NL); Gerard A. Verrijzer, Lewedorp (NL)

(73) Assignee: Eastman Chemical Resins, Inc., Kingsport, TN (US)

( * ) Notice: Subject to any disclaimer, the term of this patent is extended or adjusted under 35 U.S.C. 154(b) by 0 days.

(21) Appl. No.: 09/545,310

(22) Filed: Apr. 7, 2000

(51) Int. Cl.$^7$ ................................. C08H 5/00
(52) U.S. Cl. ....................... 526/290; 526/207; 526/237; 526/346; 526/283; 526/348.2; 526/348.3; 526/348.6; 526/348.7
(58) Field of Search ................................. 526/290, 283, 526/348.2, 348.3, 348.6, 348.7, 346, 237, 207

(56) References Cited

U.S. PATENT DOCUMENTS

| | | |
|---|---|---|
| 3,334,061 A | 8/1967 | House et al. |
| 3,622,551 A | 11/1971 | Davis |
| 3,865,797 A | 2/1975 | Joy |
| 4,020,260 A | 4/1977 | Shiozaki et al. |
| 4,037,016 A | 7/1977 | Habeck et al. |
| 4,068,062 A | 1/1978 | Lepert |
| 4,078,132 A | 3/1978 | Lepert |
| 4,098,982 A | 7/1978 | Wojcik |
| 4,130,701 A | 12/1978 | Lepert |
| 4,131,567 A | 12/1978 | Wojcik |
| 4,173,699 A | 11/1979 | Borg |
| 4,230,842 A | 10/1980 | Bullard et al. |
| 4,245,075 A | 1/1981 | Lepert |
| 4,283,518 A | 8/1981 | Iwashita et al. |
| 4,330,655 A | 5/1982 | Bullard |
| 4,342,850 A | 8/1982 | Allen et al. |
| 4,360,622 A | 11/1982 | Tsuchiya et al. |
| 4,360,628 A | 11/1982 | Runavo et al. |
| 4,371,676 A | 2/1983 | Hoene |
| 4,381,381 A | 4/1983 | Ferraris et al. |
| 4,391,961 A | 7/1983 | Small et al. |
| 4,403,080 A | 9/1983 | Hughes |
| 4,419,503 A | 12/1983 | Benitez et al. |
| 4,433,100 A | 2/1984 | Laurito |
| 4,482,688 A | 11/1984 | Schluenz |
| 4,513,130 A | 4/1985 | Mizuie et al. |
| 4,514,554 A | 4/1985 | Hughes et al. |
| 4,518,753 A | 5/1985 | Richards et al. |
| 4,533,700 A | 8/1985 | Mizui et al. |
| 4,558,107 A | 12/1985 | Evans et al. |
| 4,562,233 A | 12/1985 | Small et al. |
| 4,623,698 A | 11/1986 | Jacob et al. |
| 4,636,555 A | 1/1987 | Luvihn et al. |
| 4,677,176 A | 6/1987 | Evans et al. |
| 4,683,268 A | 7/1987 | Ahner |
| 4,684,707 A | 8/1987 | Evans |
| 4,698,405 A | 10/1987 | Runavot et al. |
| 4,757,114 A | 7/1988 | Tochiania et al. |
| 4,764,572 A | 8/1988 | Bean, Jr. |
| 4,766,169 A | 8/1988 | Lepert et al. |
| 4,810,574 A | 3/1989 | Ahner |
| 4,824,921 A | 4/1989 | Luvinh |
| 4,845,154 A | 7/1989 | Blythe et al. |
| 4,845,182 A | 7/1989 | Tochianai et al. |
| 4,853,432 A | 8/1989 | Ahner |
| 4,870,146 A | 9/1989 | Sakai et al. |
| 4,892,905 A | 1/1990 | Lepert et al. |
| 4,902,766 A | 2/1990 | Hentges |
| 4,908,420 A | 3/1990 | Sasaki et al. |
| 4,916,192 A | 4/1990 | Hentges |
| 4,933,409 A * | 6/1990 | Evans et al. ................. 526/290 |
| 4,948,849 A | 8/1990 | Blythe et al. |
| 4,952,639 A | 8/1990 | Minomiya et al. |
| 4,968,764 A | 11/1990 | Hayashida et al. |
| 4,994,516 A * | 2/1991 | Luvinh ........................ 524/275 |
| 5,013,785 A | 5/1991 | Mizui |
| 5,021,499 A | 6/1991 | Tochianai et al. |
| 5,051,485 A | 9/1991 | Schmid et al. |
| 5,128,426 A | 7/1992 | Yamasaki et al. |
| 5,162,445 A | 11/1992 | Powers et al. |
| 5,171,793 A | 12/1992 | Johnson et al. |
| 5,177,163 A * | 1/1993 | Chu et al. ..................... 526/76 |
| 5,244,996 A | 9/1993 | Kawasaki et al. |
| 5,321,092 A | 6/1994 | Williams |
| 5,395,902 A | 3/1995 | Hall |
| 5,502,140 A | 3/1996 | Daughenbagh et al. |
| 5,516,835 A | 5/1996 | Ishuguro et al. |
| 5,543,484 A | 8/1996 | Chung et al. |
| 5,552,498 A | 9/1996 | Merrill et al. |
| 5,556,932 A | 9/1996 | Rath et al. |
| 5,571,867 A | 11/1996 | Luvinh et al. |
| 5,585,442 A | 12/1996 | Knoll et al. |
| 5,627,234 A | 5/1997 | Giordano et al. |
| 5,739,225 A | 4/1998 | Tazaki et al. |
| 5,739,239 A | 4/1998 | Daughenbaugh et al. |
| 5,853,874 A | 12/1998 | Jacob |
| 5,854,367 A | 12/1998 | Salvetat et al. |
| 5,874,512 A | 2/1999 | Farley et al. |
| 5,959,049 A | 9/1999 | Powers et al. |
| 5,986,020 A | 11/1999 | Campbell et al. |

FOREIGN PATENT DOCUMENTS

| | | |
|---|---|---|
| CA | 1061940 | 9/1979 |
| CA | 1061941 | 9/1979 |
| EP | 432853 | 6/1991 |
| JP | 52125594 | 10/1977 |
| JP | 1135801 | 5/1989 |
| JP | 3199281 | 8/1991 |

\* cited by examiner

Primary Examiner—David W. Wu
Assistant Examiner—William K. Cheung
(74) Attorney, Agent, or Firm—Polly C. Owen; B. J. Boshears; Bernard J. Graves, Jr.

(57) ABSTRACT

Low color, aromatic modified $C_5$ hydrocarbon resins are disclosed. The resins are predominantly an aromatic modified piperylene resin. The resins are useful as tackifiers in hot melt adhesives and hot melt pressure sensitive adhesives.

15 Claims, No Drawings

LOW COLOR, AROMATIC MODIFIED C$_5$ HYDROCARBON RESINS

FIELD OF THE INVENTION

This invention relates to tackifier resin compositions for use in adhesives and to methods for their preparation. More particularly, this invention relates to low color, aromatic-modified C$_5$ hydrocarbon compositions prepared from piperylene concentrate and vinyl aromatic compounds and their use in adhesive applications.

BACKGROUND OF THE INVENTION

Tackifier resins can be used for making thermoplastic adhesives such as hot melt adhesives (HMA) and hot melt pressure sensitive adhesives (HMPSA). A hot melt adhesive is a solid, thermoplastic material that melts quickly upon heating. A hot melt adhesive then sets to a firm bond on cooling. A hot melt pressure sensitive adhesive retains its tackiness upon cooling. Most other types of adhesives set by evaporation of a solvent or free radical curing mechanisms. Hot melt adhesives offer quick bonding making them well suited for many automated operations. The hot melt adhesives are made of elastomers, block copolymers, ethylene vinyl acetate (EVA), or amorphous polyolefins along with low molecular weight oligomer tackifiers.

A tackifier must generally be compatible with the adhesive application. Tackifiers are chosen to impart substantial adhesive strength, promote substrate wetting and generally enhance adhesive performance. Tackifiers are commonly made by polymerization of unsaturated liphatic petroleum hydrocarbon feedstocks, such as feedstock from ethylene crackers in petroleum or petrochemical processing plants.

More specifically, tackifiers are often made from unsaturated C$_5$ hydrocarbons having two double bonds, such as C$_5$ dienes and C$_5$ cyclodienes. The C$_5$ resins are commonly made using AlCl$_3$ catalyst at a reaction temperature from about 30° to about 70° C. These resins have a softening point from 70°–120° C. for adequate wetting of a substrate, for maintaining adhesive properties and for ease of packaging. These resins often, however, have a Gardner color of about 5 to about 7 or greater, which is often too dark of a color for many adhesive applications.

Reducing the amount of C$_5$ cyclodienes in a C$_5$ resin will generally improve or lower the Gardner color, but adhesive properties of the C$_5$ resin may also be influenced, such as a lower softening point and reduced adhesive properties. For low color tackifiers with a reduced C$_5$ cyclodiene content, aromatics may be added to the C$_5$ resin to improve the resin's adhesive characteristics. Such low cyclodiene resins often also require the use of a terpene, an unsaturated cyclic C$_{10}$H$_{16}$ hydrocarbon, to satisfy the adhesive requirements, such as color and softening point. See, for example, U.S. Pat. No. 4,994,516, requiring a C$_5$ resin obtained from C$_5$ piperylenes, unsaturated vinyl aromatics and terpenes to get adequate low color without loss of softening point. The use of terpenes, however, often require preparation of that feed stream, such as feed purification or hydrotreating prior to use, making the use of terpenes often more costly and complicated manufacturing process.

C$_5$ resins with aromatic substitution often have high color and require post resin hydrogenation or hydrotreating. See, for example, U.S. Pat. No. 4,952,639 where C$_5$ resins substituted with vinyl monounsaturated aromatics have dark Gardner colors from about 5 to 7 before hydrogenation and Gardner color of less than 2 after hydrogenation of the C$_5$ resin. See also, U.S. Pat. No. 5,817,900 where hydrotreating of an aromatic-modified C$_5$ hydrocarbon resin was required to lower the Gardner color of the resin from about 7 to about 2.

Low color C$_5$ resins have been proposed without the use of post resin hydrogenation or hydrotreating. Such resins are, however, often limited in the amount of aromatic substitution. For example, U.S. Pat. No. 5,853,874 describes a low color, aromatic-modified C$_5$ resin with a Gardner color of about 3, but only describes about 5 to 15 percent weight substitution of a monovinyl aromatic into the resin. Such a substitution range on monovinyl aromatic substitution limits the usefulness of these C$_5$ resins as a tackifier in certain hot melt applications.

Other resins have been proposed with higher levels of monovinyl aromatic substitution, but require the use of a BF$_3$ catalyst, which is less active than the more commonly used AlCl$_3$ catalyst, resulting in increased manufacturing complexity and cost. For example, U.S. Pat. No. 5,177,163 describes low color monovinyl aromatic substituted C$_5$ resins having at least 30 percent by weight of a monovinyl aromatic component formed with a BF$_3$ catalyst. The BF$_3$ catalyst, however, must be neutralized with chemicals, such as lime or NH$_4$OH, which is more costly as compared to a water wash neutralization of the more commonly used AlCl$_3$ catalysts. The reaction temperature necessary for low color C$_5$ resins are about from 0° C. to about 10° C. with the BF$_3$ catalysts which is generally lower than reaction temperature requirements of the AlCl$_3$ catalyst, resulting in longer reaction times and more costly processing. Furthermore, increasing the reaction temperature of the BF$_3$ catalyst system to more economical conditions often results in undesirable molecular weights of the resulting C$_5$ resin.

As such there is a need for a monovinyl aromatic substituted C$_5$ resins with low color and good adhesive qualities without the above-mentioned disadvantages of complicated or costly resin formation processing.

SUMMARY OF THE INVENTION

The present invention relates to a random copolymer hydrocarbon composition useful as a tackifier. The inventive resins are useful in hot melt adhesives and in hot melt pressure sensitive adhesives, such as with block copolymers of styrene-isoprene-styrene (SIS), block copolymers of styrene-butadiene-styrene (SBS), multiblock (SB)$_n$ where n is from 100 to 1000, amorphous polyolefins, ethylene vinyl acetate (EVA) polymers and atactic polyalpha olefins (APAO).

In one aspect of the present invention, there is provided a hydrocarbon which is a reaction product of a first predominantly C$_5$ hydrocarbon stream containing unsaturated aliphatic monomers, such as piperylene monomers, less than about 2% weight cyclopentadiene and dicyclopentadiene monomers and less than about 1% weight isoprene, and a second hydrocarbon stream which includes a monovinyl aromatic C$_8$ to C$_{12}$ monomer. The weight ratio of said unsaturated aliphatic monomers to the monovinyl aromatic C$_8$ to C$_{12}$ monomers is from about 1.5/1 to about 6/1 to yield a unique resin having a Gardner color of less than about 4 and having a ring and ball softening point from about 85° C. to about 100° C. Desirably, the monovinyl aromatic C$_8$ to C$_{12}$ monomer is α-methylstyrene. The inventive resin may further include from about 0 to about 15 weight percent isobutylene, isoamylene or combinations thereof. Desirably, the resin has a Mz from about 2000 to 4000 and a polydispersity of about 1.7 to about 2.0. A resin having a Mz from about 2500 to 3700 is also useful.

In another aspect of the present invention, there is provided a hydrocarbon resin which is a reaction product of a first predominantly $C_5$ hydrocarbon stream which includes: (i) unsaturated aliphatic monomers, such as piperylene monomers; (ii) less than about 2% weight cyclopentadiene and dicyclopentadiene monomers; and (iii) less than about 1% weight isoprene; and a second hydrocarbon stream which includes a monovinyl aromatic $C_8$ to $C_{12}$ monomer. The weight ratio of the unsaturated aliphatic monomers to the monovinyl aromatic $C_8$ to $C_{12}$ monomers is desirably from about 15/1 to about 50/1. In this aspect of the invention, this resin has a Gardner color of less than about 4 and having a ring and ball softening point from about 85° C. to about 100° C. Desirably, the monovinyl aromatic $C_8$ to $C_{12}$ monomer is α-methylstyrene. The inventive resin may further include from about 15 to about 25 weight percent isobutylene, isoamylene or combinations thereof. Desirably, the resin has a Mz from about 2500 to 4000 and a polydispersity of about 1.7 to about 2.0. A resin having a Mz from about 3000 to 3500 is also useful.

The inventive hydrocarbon copolymer resins may be prepared by (a) providing a first predominantly $C_5$ hydrocarbon stream containing: (i) unsaturated aliphatic monomers, such as piperylene monomers; (ii) less than about 2% weight cyclopentadiene and dicyclopentadiene monomers; and (iii) less than about 1% weight isoprene; (b) providing a second hydrocarbon stream comprising a monovinyl aromatic $C_8$ to $C_{12}$ monomer; (c) combining the streams to obtain a weight ratio of the unsaturated aliphatic monomers to the monovinyl aromatic $C_8$ to $C_{12}$ monomers from about 1.5/1 to about 25/1; (d) polymerizing the combined streams at a temperature from about 25 to about 75° C.; and (e) recovering the copolymer resin.

The inventive hydrocarbon resins may also be prepared by providing a $C_4$ to $C_5$ isoolefin, which is also an unsaturated aliphatic monomer. Desirably the $C_4$ to $C_5$ isoolefin is provided as isobutylene and the monovinyl aromatic $C_8$ to $C_{12}$ monomer is provided as α-methylstyrene. In a further aspect of the present invention the isobutylene and the α-methylstyrene are provided in substantially pure form, i.e., substantially free from other hydrocarbons.

DETAILED DESCRIPTION OF THE INVENTION

The present invention is a random copolymer hydrocarbon resin useful as a tackifier. The inventive resins have low color and suitable adhesives properties for use as tackifiers in hot melt and hot melt pressure sensitive adhesives.

The inventive resins are low color, aromatic modified hydrocarbon resins. These resins are a polymerization reaction product of unsaturated aliphatic monomers and monovinyl aromatic $C_8$ to $C_{12}$ monomers. Unsaturated aliphatic monomers include, but are not limited to, isobutylene, isoprene, isoamylene (2-methyl-2-butene), trans-piperlene (trans-1,3 pentadiene), cis-piperyene (cis- 1,3 pentadiene), cyclopentadiene and dicyclopentadiene. Desirably, the amounts of cyclopentadiene and dicyclopentadiene monomers are limited to lower the Gardner color of the $C_5$ resin. Moreover, the $C_5$ resins of the present invention contain less than about 2 weight percent cyclopentadiene and/or dicyclopentadiene monomers. More desirably, the inventive $C_5$ resin contains less than about 1.2 weight percent cyclopentadiene and/or dicyclopentadiene monomers.

Many of the unsaturated aliphatic monomers are provided via a concentrated piperylene stream. The concentrated piperylene stream desirably contains about 60 weight percent or more cis- and trans-piperylenes to provide, in part, a low color hydrocarbon resin. In the present invention, useful concentrated piperylene streams also contain about 1 weight percent or less isoprene and about 2 weight percent or less of cyclopentadiene and/or dicyclopentadiene. Limiting the level of the isoprene, cyclopentadiene and dicyclopentadiene in these ranges contributes to the improved lighter color of the copolymer hydrocarbon resin.

Useful monovinyl aromatic $C_8$ to $C_{12}$ monomers in the present invention include, but are not limited to, styrene, meta-methylstryene, para-methylstyrene, α-methylstyrene, meta-methyl-α-methylstryene, para-methyl α-methylstyrene, tert-butylstyrene, and the like. In one aspect of the present invention, α-methylstyrene is desired as the monovinyl aromatic $C_8$ to $C_{12}$ monomer in the inventive resins.

The inventive resins may also contain a $C_4$ to $C_5$ isoolefin, i.e., isobutylene or isoamylene. The inclusion of the $C_4$ to $C_5$ isoolefin narrows the molecular weight range of the random copolymers formed from the polymerization reaction of the unsaturated aliphatic monomers and the monovinyl aromatic $C_8$ to $C_{12}$ monomers.

In one aspect of the present invention, a hydrocarbon copolymer resin comprises a reaction product of (a) a first predominantly $C_5$ hydrocarbon stream containing unsaturated aliphatic monomers and (b) a second hydrocarbon stream comprising a monovinyl aromatic $C_8$ to $C_{12}$ monomer. The unsaturated aliphatic monomers include a combination of (i) piperylene monomers; (ii) less than about 2% weight cyclopentadiene and/or dicyclopentadiene monomers; and (iii) less than about 1% weight isoprene. The resin has a weight ratio of the unsaturated aliphatic monomers to the monovinyl aromatic $C_8$ to $C_{12}$ monomers from about 1.5/1 to about 6/1 to yield an inventive resin having a Gardner color of less than about 4 and having a ring and ball softening point from about 85° C. to about 100° C.

Desirably, this resin has a Mz from about 2000 to 4000 and a polydispersity of about 1.7 to about 2.0 to impart desirable adhesive characteristics to the resin. A resin having a Mz from 2500 to 3700 is also useful as a low color resin. Unlike low-molecular weight compounds where the molecular weight in a sample is uniform, the copolymers of the present invention are polydisperse. The resins are composed of polymer chains of varying length and hence often exhibit a distribution of molecular weights. As such the resins are often characterized by different molecular weight expressions as described below:

Number average molecular weight, $$M_n = \frac{\Sigma n_i M_i}{\Sigma n_i},$$

Weight average molecular weight, and $$M_w = \frac{\Sigma w_i M_i}{\Sigma w_i},$$

Z-average molecular weight, $$M_z = \frac{\Sigma n_i M_i^3}{\Sigma n_i M_i^2},$$

where $M_i$ is molecular weight, $n_i$ is the number of moles and $w_i$ is the weight of the i component molecules of the polymer. As used herein the term polydispersity and its variants refer to a ration of molecular weights of the resin, i.e., Mw/Mn.

Molecules of greater mass contribute more to the Mz molecular weight than do less massive molecules. The Mn molecular weight is sensitive to the presence of low-molecular weight tails. The Mz gives an indication of a high molecular weight tail in the resin and has a pronounced effect on the compatibility of the resin in an adhesive base polymer. High Mz is generally undesirable. Mw is an indication of the average molecular weight of the resin. Mn provides information on the lower molecular weight portions of the resin. The polydispersity describes the broadness of the molecular weight distribution and is the ratio of Mw/Mn. Mz, Mn, and Mw can be determined by size exclusion chromatography using a refractive index detector.

One particularly useful monovinyl aromatic $C_8$ to $C_{12}$ monomer is α-methylstyrene which provides, in part, low color and good adhesive characteristics to the resin. The resin may further include from about 0 to about 15 weight percent of an isoolefin monomer, such as isobutylene, isoamylene and combinations thereof. When the isoolefin monomer is included in the reaction composition, the isoolefin monomer is considered part of the unsaturated aliphatic monomers in the above-described weight ratio of the resin.

In another aspect of the present invention, a hydrocarbon copolymer resin is prepared as a reaction product of: (a) a first predominantly $C_5$ hydrocarbon stream containing unsaturated aliphatic monomers and (b) a second hydrocarbon stream comprising a monovinyl aromatic $C_8$ to $C_{12}$ monomer. The unsaturated aliphatic monomers include a combination of piperylene monomers, less than about 2% weight cyclopentadiene and/or dicyclopentadiene monomers and less than about 1% weight isoprene. The resin desirably has a weight ratio of unsaturated aliphatic monomers to monovinyl aromatic $C_8$ to $C_{12}$ monomers from about 15/1 to about 50/1 to yield a resin having a Gardner color of less than about 4 and having a ring and ball softening point from about 85° C. to about 100° C. Desirably, the resin has a Mz from about 2500 to 4000 and a polydispersity of about 1.7 to about 2.0. A resin with a Mz from about 3000 to about 3500 is also useful. This resin may further include from about 15 to about 25 weight percent of an isoolefin monomer, such as isobutylene, isoamylene and combinations thereof.

The inventive hydrocarbon copolymer resins of the present invention, which have a Gardner color of less than about 4 and having a ring and ball softening point from about 85° C. to about 100° C., may be prepared by (a) providing a first predominantly $C_5$ hydrocarbon stream containing unsaturated aliphatic monomers; (b) providing a second hydrocarbon stream which includes a monovinyl aromatic $C_8$ to $C_{12}$ monomer; (c) combining the streams to obtain a weight ratio of the unsaturated aliphatic monomers to the monovinyl aromatic $C_8$ to $C_{12}$ monomers from about 1.5/1 to about 25/1; (d) polymerizing the combined streams at a temperature from about 25° C. to about 75° C.; and (e) recovering the copolymer resin. The unsaturated aliphatic monomers comprising a combination of piperylene monomers, cyclopentadiene and/or dicyclopentadiene monomers in amounts of about 2% less and less than about 1% weight isoprene.

In accordance with the present invention, it has been found that a useful concentrated piperylene stream desirably contains about 60 weight percent or more, cis- and trans- piperylenes to provide, in part, a low color hydrocarbon resin. As previously stated, the concentrated piperylene stream also contains about 1 weight percent or less isoprene and about 2 weight percent or less of cyclopentadiene and/or dicyclopentadiene. Limiting the levels of the isoprene, cyclopentadiene and dicyclopentadiene improves the color of the copolymer hydrocarbon resin. Desirably, the concentrated piperylene stream is a heat-soaked stream to reduce the cyclodiene content therein. During the heat-soak operation, cyclopentadiene is converted to dicyclopentadiene without substantial loss of the desirable piperylenes. The heat-soak is performed at low temperature, such as about 30° C., for periods of time, such as up to about 6 weeks. The heat-soaked piperylene stream is then distilled to remove a substantial portion of the dicyclopentadiene. In the present invention, piperylene streams with low levels of cyclopentadiene and dicyclopentadiene, such as heat-soaked piperylene streams, form low color resins.

The piperylene stream often contains other $C_5$ hydrocarbons, such as $C_5$ monoolefins and $C_5$ paraffins. The $C_5$ monoolefins, such as but not limited to, 1-pentene, trans-2-pentene, cis-2-pentene, and cyclopentene, may react to some extent and form part of the resin copolymer. By preparing a resin with a concentrated piperylene stream, the reactive $C_5$ monoolefins are reduced to lower levels as compared to a non-concentrated piperylene stream. Limiting the amount of reactive $C_5$ monoolefins provides a resin prepared by the process of the present invention with a more narrow range of polydispersity. Such a narrow range of polydispersity is often desirable for compatibility of the resin with the base polymer of the adhesive. Piperylene streams are often commercially available from petroleum refining or petrochemical complexes. Such streams may result from the catalytic cracking of crude oil components or the steam cracking of light hydrocarbons. Distillation is one technique commonly used to concentrate the piperylenes from other hydrocarbons.

A useful piperylene stream for the practice of the present invention includes on a weight basis about 0.4% isoprene, about 0.8% trans-2-pentene, about 1.8% cis-2-pentene, about 6.6% 2-me-2-butene (isoamylene), about 43.3% trans-1,3-pentadiene (trans-piperylene), about 1.2% cyclopentadiene, about 23.9% cis-1,3-pentadiene (cis-piperylene), about 17.1% cyclopentene, about 3.4% cyclopentane, and about 0.1% dicyclopentadiene.

Useful monovinyl aromatic $C_5$ to $C_{12}$ monomers in the present invention include, but are not limited to, styrene, meta-methylstryene, para-methylstyrene, α-methylstyrene, meta-methyl-a-methylstryene, para-methyl α-methylstyrene, tert-butylstyrene, and the like. In one aspect of the present invention, an α-methylstyrene stream is provided for use as the monovinyl aromatic $C_8$ to $C_{12}$ monomer in the inventive process. Desirably the ca-methylstyrene stream is substantially pure, i.e., substantially free of other monovinyl aromatic $C_8$ to $C_{12}$ monomers, unsaturated aliphatic monomers and reactive monoolefins. The use of a substantially pure α-methylstyrene stream aids in the preparation of a low color resin by reducing impurities therein. Desirably, the α-methylstyrene stream contains at least about 98 weight percent α-methylstyrene. More desirably, the α-methylstyrene stream contains at least about 99 weight percent α-methylstyrene The inventive resins may also contain a $C_4$ to $C_5$ isoolefin, i.e., isobutylene or isoamylene. The inclusion of the $C_4$ to $C_5$ isoolefins is often useful in providing a $C_5$ resin with a narrow molecular weight range of the random copolymers formed from the polymerization reaction of the unsaturated aliphatic monomers and the monovinyl aromatic $C_8$ to $C_{12}$ monomers. A typical concentrated piperylene stream may contain some amounts of isoamylene, such as up to about 10 weight percent isoamylene. Additional amounts of $C_4$ to $C_5$ isoolefins may be advantageously added to the reaction mixture to control the molecular weight and polydispersity of the resin. The additional amounts of $C_4$ to $C_5$ isoolefins are desirably added as a substantially pure isobutylene or a pure isoamylene stream to avoid the introduction of impurities that may increase the color of the copolymer resin formed therefrom. Desirably, providing a 98 weight percent pure isobutylene or isoamylene stream facilitates the generation of low color resins. Even more desirably is a 99 weight percent pure isobutylene or isoamylene stream.

In one aspect the process of the present invention combines the unsaturated aliphatic monomer stream, the monovinyl aromatic $C_8$ to $C_{12}$ monomer stream, and the $C_4$ to $C_5$ isoolefin stream, if any, at a weight ratio of unsaturated aliphatic monomers, including $C_4$ and $C_5$ isoolefins, to the monovinyl aromatic $C_8$ to $C_{12}$ monomers in the range of from about 23/1 to about 25/1 to provide a copolymer resin with a Gardner of 4 or less, a ring and ball softening point from about 90° C. to 100° C., a Mz from about 2500 to about 4000 daltons and a polydispersity of about 1.7 to about 2.0.

In another aspect the process of the present invention combines the unsaturated aliphatic monomer stream, the monovinyl aromatic $C_8$ to $C_{12}$ monomer stream, and the $C_4$ to $C_5$ isoolefin stream, if any, at a weight ratio of unsaturated aliphatic monomers, including $C_4$ and $C_5$ isoolefins, to the monovinyl aromatic $C_8$ to $C_{12}$ monomers from about 3/1 to about 5/1 to yield a copolymer resin having a Gardner color of about 4 or less, a ring and ball softening point from about 85° C. to 95° C., a Mz from about 2700 to about 4000 daltons and a polydispersity of about 1.7 to about 2.0.

In yet another aspect of the present invention, the process of the present invention combines the unsaturated aliphatic monomer stream, the monovinyl aromatic $C_8$ to $C_{12}$ monomer stream, and the $C_4$ to $C_5$ isoolefin stream, if any, at a weight ratio of unsaturated aliphatic monomers, including $C_4$ and $C_5$ isoolefins, to the monovinyl aromatic $C_8$ to $C_{12}$ monomers from about 1.5/1 to about 2.5/1 to yield a copolymer resin having a Gardner color of about 4 or less, a ring and ball softening point from about 85° C. to 95° C., a Mz from about 2000 to about 3800 daltons and a polydispersity of about 1.7 to about 2.0.

The resins of the present invention are desirably prepared by chemically reacting the unsaturated aliphatic monomer stream, the monovinyl aromatic $C_8$ to $C_{12}$ monomer stream, and the $C_4$ to $C_5$ isoolefin stream, if any, at the above-described weight ratios of unsaturated aliphatic monomers, including $C_4$ and $C_5$ isoolefins, to the monovinyl aromatic $C_8$ to $C_{12}$ monomers. More specifically, monomers in the streams are polymerized to form the inventive resins. Cationic polymerization of the streams is useful, but other useful polymerization techniques, such as anionic polymerization, thermal polymerization, coordination polymerization utilizing Ziegler-Natta catalysts, and the like, may also be practiced with the present invention.

In one aspect the process of the present invention includes the step of providing from about 1% to about 4% weight of a Friedel-Crafts catalyst for cationically polymerizing the reactive monomers. Desirably, the Friedel-Crafts catalyst is liquefied $AlCl_3/H_2O$/trimethylbenzene complex. A particularly useful complex has a mole ratio of $AlCl_3$ to $H_2O$ from about 3/1 to about 7/1 and a mole ratio of trimethylbenzene to $H_2O$ from about 3/1 to about 7/1.

The process of the present invention may be conducted at any convenient reaction temperature, such as from about 0° C. to 100° C. A useful reaction temperature is from about 30° C. to 70° C. Reaction temperature of about 50° C. is also useful.

The polymerization reaction is typically exothermic. To maintain the reaction temperature at a desirable temperature heat is often remove from a reaction vessel through a cooling mechanism, such as heat exchange equipment. Furthermore, the reaction mixture of monomers may be diluted with a solvent, such as toluene or other non-reactive hydrocarbons. Dilution of the reaction mixture with about 40 to 80 weight percent hydrocarbon solvent is useful.

The polymerization reaction is controlled in a reaction vessel, such as a batch reactor or a continuous stirred tank reactor (CSTR). The polymerization catalyst is added into the reactor to initiate catalytic polymerization. The reactor is equipped with a heat exchanger to control the reaction temperature. The average residence time in a reactor is from about 15 minutes to about several hours. The present invention is not limited to the use of a single reactor, but several reactors may be operated in series or parallel for the preparation of the inventive resins.

The reactor effluent drains into a mixer/settler combination, in which the polymer solution is washed with water. The washing and settling are done to deactivate and remove all catalyst, such as $AlCl_3$, from the polymer solution. The polymer solution is fed into an evaporator to remove undesirable hydrocarbons, such as the hydrocarbon solvent, from the polymerization mixture by distillation under reduced pressure. The product effluent of the evaporator, in the form of a molten resin stream, is pumped to a heated receiver tank. From this tank small drops of resin are formed and solidified on a cooling belt. The solidified resin droplets are a convenient commercial form of the inventive resins.

The present invention is further described with reference to the following non-limiting examples.

EXAMPLES

Example 1

A low color, aromatic modified $C_5$ hydrocarbon resin was prepared from a piperylene stream. Typical component analysis of the piperylene stream is shown in Table 1. Weight parts, as shown in Table 2, of the piperylene stream, α-methylstyrene, isobutylene and toluene were combined into a reactor. The amount of toluene, which is a non-reactive hydrocarbon solvent, was set at about 60 weight percent. The amounts of the piperylene stream, the α-methylstyrene and isobutylene were controlled to a 96/4 weight ratio of unsaturated aliphatic monomers to monovinyl aromatic monomers. The unsaturated aliphatic monomers included isobutylene, isoprene, isoamylene, trans-piperylene, cyclopentadiene and dicyclopentadiene. The monovinyl aromatic monomer included α-methylstyrene.

About 3% weight catalyst was added to the reactor. The catalyst used was a liquified $AlCl_3/H_2O$/trimethylbenzene complex in a mole ratio of 5/1/05.

While maintaining a reaction temperature of about 50° C., a polymerization reaction product was recovered after about two hours. This product, i.e., inventive composition No. 1, had a Gardner color of about 3.5. Gardner color was determined by mixing equal weight parts of product with reagent grade toluene at room temperature until the product dissolves. The Gardner color of the product is determined according to method ASTM D-1544-80 (also ISO 4630) on a LICO-200 photometer available from Nederland B. V., Kesteren, The Netherlands. The color values on this test range from about 1 to about 18, with 18 being the darkest. A color of less than Gardner 1 indicates a water white solution.

The product had a ring and ball softening point of 97° C., as measured according to procedure ASTM E28-67.

Furthermore, the product had a MMAP cloud point of 86° C. MMAP is a mixed methylcyclohexane aniline cloud point as determined by a modified ASTM D 611 procedure. Methylcyclohexane was substituted for heptane in the ASTM D 611 test procedure. The modified procedure used a sample of product/aniline/methylcyclohexane in a ratio of 1/2/1 (weight/volume/volume). The sample is heated and subsequently cooled until complete turbidity just occurs, which is the reported MMAP cloud point.

DACP is a diacetone cloud point and is determined by cooling a heated solution of equal weight parts of resin, xylene and diacetone to a point where the solution becomes cloudy. The inventive composition had a DACP cloud point of 45° C.

Molecular weights were measured by size exclusion chromatography and are previously defined herein.

TABLE 1

Typical Component Analysis of the Piperylene Stream

| Component | Weight Percent |
|---|---|
| Isobutylene | 0 |
| Isopentane | 0 |
| 1-pentene | 0 |
| 2-methyl-1-butene | 0 |
| n-pentane | 0 |
| Isoprene | 0.4 |
| trans-2-pentene | 0.8 |
| cis-2-pentene | 1.8 |
| 2-me-2-butene (isoamylene) | 6.6 |
| trans-1,3-pentadiene (trans-piperylene) | 43.3 |
| cyclopentadiene | 1.2 |
| cis-1,3-pentadiene (cis-piperylene) | 23.9 |
| Cyclopentene | 17.1 |
| Cyclopentane | 3.4 |
| dicyclopentadiene | 0.1 |
| Unknowns | 1.4 |
| Total | 100 |

TABLE 2

Inventive Composition No. 1

| | Composition No. 1 |
|---|---|
| Catalyst, Wt. % | 3.0 |
| Piperylene Stream | 30.4 |
| α-Methylstyrene, 99.9% Wt. Purity | 1.8 |
| Isobutylene, 99.9% Wt. Purity | 7.8 |
| Toluene | 60 |
| Total Monomer content | 40 |
| Unsaturated Aliphatic/Monovinyl Aromatic Monomers | 96/4 |
| Reaction Temperature ° C. | 50 |
| Results: | |
| Resin Yield | 43.1 |
| Softening Point, Ring and Ball (° C.) | 97 |
| Gardner Color | 3.5 |
| MMAP ° C. | 86 |
| DACP ° C. | 45 |
| Mn DRI (daltons) | 1066 |
| Mw DRI (daltons) | 1764 |
| Mz DRI (daltons) | 3100 |
| Mw/Mn | 1.7 |

Example 2

A second inventive composition was prepared and analyzed as described in Example 1. The weight ratio of unsaturated aliphatic monomers to monovinyl aromatic monomers, however, was controlled at 80/20. The product resin had a Gardner color of 3.8 and a ring and ball softening point of 91° C. Other details are presented in Table 3.

TABLE 3

Inventive Composition No. 2

| | Composition No. 2 |
|---|---|
| Catalyst, Wt. % | 2.4 |
| Piperylene Stream | 28.8 |
| α-Methylstyrene, 99.9% Wt. Purity | 7.9 |
| Isobutylene, 99.9% Wt. Purity | 3.3 |
| Toluene | 60 |
| Total Monomer content | 40 |
| Unsaturated Aliphatic/Monovinyl Aromatic Monomers | 80/20 |
| Reaction Temperature ° C. | 50 |
| Results: | |
| Resin Yield | 42.3 |
| Softening Point, Ring and Ball (° C.) | 91 |
| Gardner Color | 3.8 |
| MMAP ° C. | 75 |
| DACP ° C. | 26 |
| Mn DRI (daltons) | 938 |
| Mw DRI (daltons) | 1754 |
| Mz DRI (daltons) | 3540 |
| Mw/Mn | 1.9 |

Example 3

A third inventive composition was prepared and analyzed as described in Example 1. The weight ratio of unsaturated aliphatic monomers to monovinyl aromatic monomers, however, was set at 65/35. Furthermore, isobutylene was not added into the reactor. The product resin had a Gardner color of 3.1 and a ring and ball softening point of 90° C. Other details are presented in Table 4.

TABLE 4

Inventive Composition No. 3

| | Composition No. 3 |
|---|---|
| Catlayst, Wt. % | 2.1 |
| Piperylene Stream | 26 |
| α-Methylstyrene, 99.9% Wt. Purity | 14 |
| Isobutylene, 99.9% Wt. Purity | 0 |
| Toluene | 60 |
| Total Monomer content | 40 |
| Unsaturated Aliphatic/Monovinyl Aromatic Monomers | 65/35 |
| Reaction Temperature ° C. | 50 |
| Results: | |
| Resin Yield | 42.4 |
| Softening Point, Ring and Ball (° C.) | 90 |
| Gardner Color | 3.1 |
| MMAP ° C. | 52 |
| DACP ° C. | 7 |
| Mn DRI (daltons) | 890 |
| Mw DRI (daltons) | 1500 |
| Mz DRI (daltons) | 2730 |
| Mw/Mn | 1.7 |

Example 4

The compositions of Examples 1, 2 and 3 were combined into Styrene-Isoprene-Styrene Hot Melt Pressure Sensitive Adhesive (SIS HMPSA) formulations as shown in Table 5. Kraton® D-1160 is a styrene-isoprene-styrene block copolymer available form the Shell Co. or the Kraton Co. Shellflex® 451 FC is a refined petroleum oil available from the Shell Co. Irganox® 1010 is a hindered phenol antioxidant available from the Ciba-Geigy.

SIS HMPSA formulations were also prepared with Piccotace® 212, a commercial hydrocarbon resin available from Hercules, Inc., and to Escorez® 2203 LC, a commercial modified aliphatic resin available from Exxon-Mobil.

The SIS HMPSA formulations with the compositions of Examples 1, 2 and 3 proved to be effective adhesives. In particular, the formulations with the inventive compositions had improved tack, as indicated by lower roll ball tack and lower loop tack. Shear Adhesion Failure Temperature (SAFT) is a measurement of a temperature at which a lap shear bond fails under load.

TABLE 5

HMPSA SIS Formulations

| Components | Parts by weight | | | | |
|---|---|---|---|---|---|
| Kraton® D-1160 | 100 | 100 | 100 | 100 | 100 |
| Composition No. 1 | 120 | | | | |
| Composition No. 2 | | 120 | | | |
| Composition No. 3 | | | 120 | | |
| Piccotac® 212 | | | | 120 | |
| Escorez® 2203 LC | | | | | 120 |
| Shellflex® 451 FC | 20 | 20 | 20 | 20 | 20 |
| Irganox® 1010 | 2 | 2 | 2 | 2 | 2 |
| Results | | | | | |
| Coating weight (grams) | 21 | 18 | 19 | 20 | 19 |
| Viscosity at 175° C. (mPa) | 85,400 | 51,200 | 40,800 | 70,800 | 74,800 |
| Peel adhesion to steel at N/2.5 kg (minutes) | 10.6 | 12.3 | 11.2 | 10.6 | 10.0 |
| Rolling ball tack (cm) | 5 | 7 | 6 | 11 | 16 |
| Loop tack (N/25 mm) | 13.4 | 13.6 | 16.4 | 16.7 | 15.3 |
| SAFT, 0.5 kg ° C. | 96 | 99 | 91 | 97 | 95 |

Example 5

Additional SIS HMPSA formulations were prepared by using less Shellflex® 451 FC as compared to Example 4, which generally resulted in more viscous formulations. The SIS HMPSA formulations formed from the compositions of Examples 1, 2 and 3 had improved adhesive properties as compared to the other formulations.

TABLE 6

HMPSA SIS Formulations

| Components | Parts by weight | | | | |
|---|---|---|---|---|---|
| Kraton® D-1160 | 100 | 100 | 100 | 100 | 100 |
| Composition No. 1 | 110 | | | | |
| Composition No. 2 | | 110 | | | |
| Composition No. 3 | | | 110 | | |
| Piccotac® 212 | | | | 110 | |
| Escorez® 2203 | | | | | 110 |
| Shellflex® 451 FC | 10 | 10 | 10 | 10 | 10 |
| Irganox® 1010 | 2 | 2 | 2 | 2 | 2 |
| Results | | | | | |
| Coating weight (grams) | 19 | 19 | 19 | 20 | 18 |
| Viscosity at 175° C. (mPa) | 145,600 | 79,800 | 53,000 | 121,000 | 166,000 |
| Peel adhesion to steel at N/2.5 kg (minutes) | 12.5 | 11.9 | 9.2 | 10.6 | 11.3 |
| Rolling ball tack (cm) | 6 | 9 | 14 | 16–30 | 13–30 |
| Loop tack (N/25 mm) | 16.4 | 17.3 | 15.3 | 17.5 | 17.3 |
| SAFT, 0.5 kg ° C. | 99 | 101 | 100 | 99 | 100 |

Example 6

The compositions of Examples 1, 2 and 3 were combined into Styrene-Butadiene-Styrene Hot Melt Pressure Sensitive Adhesive (SBS HMPSA) formulations as shown in Table 7. Kraton® D-1102 is a styrene-butadiene-styrene block copolymer available from Shell Co. or Kraton Co. Europrene® 1205 is styrene-butadiene random copolymer and available from Enichem. The formulations with the inventive compositions had improved tack or peel adhesion as compared to formulations containing Escorez® 2203, a modified hydrocarbon resin available from Exxon-Mobil, or Wingtack® 86, a modified $C_5$ hydrocarbon resin available from Goodyear Chemical Co.

TABLE 7

HMPSA SBS Formulations

| Components | Parts by weight | | | | |
|---|---|---|---|---|---|
| Kraton® D-1102 | 75 | 75 | 75 | 75 | 75 |
| Europrene® 1205 | 25 | 25 | 25 | 25 | 25 |
| Composition No. 1 | 175 | | | | |
| Composition No. 2 | | 175 | | | |
| Composition No. 3 | | | 175 | | |

TABLE 7-continued

HMPSA SBS Formulations

| Components | Parts by weight | | | | |
|---|---|---|---|---|---|
| Escorez ® 2203 | | | | 175 | |
| Wingtack ® 86 | | | | | 175 |
| Shellflex ® 451 FC | 50 | 50 | 50 | 50 | 50 |
| Irganox ® 1010 | 2 | 2 | 2 | 2 | 2 |
| Coating weight (grams) | 21 | 21 | 21 | 21 | 20 |
| Viscosity at 175° C. (mPa) | 9,120 | 8,840 | 9,320 | 9,100 | 8,080 |
| Peel adhesion to steel at N/2.5 kg (minutes) | 4.6 | 6.1 | 13.3 | 6.3 | 8.5 |
| Rolling ball tack (cm) | >30 | >30 | 12–30 | >30 | >30 |
| Loop tack (N/25 mm) | 0.4 | 1.7 | 24.2 | 0.2 | 11.5 |
| SAFT, 0.5 kg ° C. | Ntd | 67 | 74 | 65 | 72 |

Example 7

The compositions of Examples 1, 2, and 3 were combined into Ethylene Vinylacetate (EVA) formulations as shown in Table 8. Evatane® 18150 is an ethylene vinylacetate polymer available from Elf Atochem. Paraffinwax 58/60 is paraffin wax having a melting point of about 60° C. available from BP Oil Co and Exxon-Mobil. The EVA formulations, based on the compositions from Examples 1, 2 and 3, had adequate adhesive characteristics as compared to other formulations.

TABLE 8

EVA Formulations

| Components | Parts by weight | | | | | | | |
|---|---|---|---|---|---|---|---|---|
| Evatane ® 18150 | 30 | 30 | 30 | 30 | 30 | 30 | 30 | 30 |
| Composition No. 1 | 45 | | | | | | | |
| Composition No. 2 | | 45 | | | | | | |
| Composition No. 3 | | | 45 | | | | | |
| Escorez ® 2203 | | | | 45 | | | | |
| Wingtack ® 86 | | | | | 45 | | | |
| Permalym ® 6110 | | | | | | 45 | | |
| Permalym ® 5095 | | | | | | | 45 | |
| Sylvalite ® PE100S | | | | | | | | 45 |
| Paraffinwax 58/60 | 25 | 25 | 25 | 25 | 25 | 25 | 25 | 25 |
| Irganox ® 1010 | 0.2 | 0.2 | 0.2 | 0.2 | 0.2 | 0.2 | 0.2 | 0.2 |
| Results | | | | | | | | |
| Cloud Point (° C.) | 64 | 60 | 61 | 64 | 68 | 74 | 74 | 66 |
| Tensile Properties | | | | | | | | |
| Yield Point (N/mm$^2$) | 0.7 | 0.7 | 0.7 | 0.7 | 0.8 | 0.7 | 0.6 | 0.8 |
| Break Force (N/mm$^2$) | 1.7 | 1.8 | 1.9 | 2 | 1.8 | 2.7 | 1.8 | 2.3 |
| Elongation (%) | 52 | 49 | 53 | 4 | 60 | 84 | 96 | 79 |
| Tensile Strength (N/mm$^2$) | 4.1 | 4 | 4.1 | 4.3 | 3.9 | 4.3 | 4 | 4.3 |
| Modulus (Mpa) | 124 | 131 | 118 | 131 | 119 | 101 | 103 | 122 |
| Viscosity (mPas) | | | | | | | | |
| 120° C. | 2190 | 2300 | 2375 | 2270 | 2200 | 2645 | 2400 | 2680 |
| 140° C. | 1167 | 1217 | 1262 | 1195 | 1165 | 1377 | 1260 | 1390 |
| 160° C. | 690 | 713 | 740 | 685 | 671 | 793 | 735 | 791 |
| 180° C. | 422 | 439 | 457 | 424 | 418 | 485 | 456 | 490 |
| Aluminum T-Peel (N/mm$^2$) | 1.7 | 2 | 2.4 | 1.2 | 3.3 | 3.7 | 3.4 | 3.2 |

Example 8

The compositions of Examples 1, 2 and 3 were combined into EVA formulations as shown in Table 8. Evatane® 28420 is an ethylene vinylacetate polymer available from Elf Atochem. The EVA formulations, based on the compositions from Examples 1, 2 and 3 had adequate adhesive characteristics as compared to other formulations.

TABLE 9

EVA Formulations

| Components | Parts by weight | | | | | | | |
|---|---|---|---|---|---|---|---|---|
| Evatane ® 28420 | 30 | 30 | 30 | 30 | 30 | 30 | 30 | 30 |
| Composition No. 1 | 45 | | | | | | | |
| Composition No. 2 | | 45 | | | | | | |
| Composition No. 3 | | | 45 | | | | | |
| Escorez ® 2203 | | | | 45 | | | | |
| Wingtack ® 86 | | | | | 45 | | | |
| Permalym ® 6110 | | | | | | 45 | | |
| Permalym ® 5095 | | | | | | | 45 | |
| Sylvalite ® PE100S | | | | | | | | 45 |
| Paraffinwax 58/60 | 25 | 25 | 25 | 25 | 25 | 25 | 25 | 25 |
| Irganox ® 1010 | 0.2 | 0.2 | 0.2 | 0.2 | 0.2 | 0.2 | 0.2 | 0.2 |
| Results | | | | | | | | |
| Cloud Point (° C.) | 82 | 61 | 64 | 97 | 60 | 54 | 60 | 60 |
| Tensile Properties | | | | | | | | |
| Yield Point (N/mm$^2$) | 0.5 | 0.4 | 0.4 | 0.5 | 0.4 | 0.3 | 0.3 | 0.3 |
| Break Force (N/mm$^2$) | 1.1 | 0.9 | 0.8 | 1.2 | 0.7 | 1.3 | 1.3 | 1.3 |
| Elongation (%) | 61 | 60 | 65 | 55 | 72 | 176 | 174 | 196 |
| Tensile Strength (N/mm$^2$) | 2.9 | 2.9 | 2.8 | 3.2 | 2.6 | 2.6 | 2.5 | 2.7 |
| Modulus (Mpa) | 82 | 69 | 65 | 83 | 59 | 51 | 41 | 50 |
| Viscosity (mPas) | | | | | | | | |
| 120° C. | 1270 | 1337 | 1397 | 1320 | 1250 | 1562 | 1390 | 1610 |
| 140° C. | 671 | 705 | 737 | 696 | 658 | 813 | 732 | 825 |
| 160° C. | 394 | 414 | 432 | 406 | 687 | 474 | 428 | 476 |
| 180° C. | 246 | 259 | 273 | 255 | 242 | 287 | 268 | 295 |
| Aluminum T-Peel (N/mm$^2$) | 1.2 | 4.5 | 4.9 | 0.9 | 5.9 | 8.3 | 7.7 | 7.8 |

In the foregoing the invention has been described by means of specific embodiments, but it will be understood that various changes and modifications may be performed without deviating from the scope and spirit of the invention.

We claim:

1. A process for making a hydrocarbon copolymer resin having a Gardner color of less than about 4 and having a ring and ball softening point from about 85 to about 100° C. comprising:

(a) providing a first predominantly $C_5$ hydrocarbon component comprising unsaturated aliphatic monomers, said unsaturated aliphatic monomers comprising a combination of piperylene monomers, less than about 2% weight cyclopentadiene and dicyclopentadiene monomers and less than about 1% weight isoprene;

(b) providing a second hydrocarbon component comprising a monovinyl aromatic $C_8$ to $C_{12}$ monomer;

(c) combining said components to obtain a weight ratio of said unsaturated aliphatic monomers to said monovinyl aromatic $C_8$ to $C_{12}$ monomers from about 1.5/1 to about 25/1;

(d) polymerizing said combined components at a temperature from about 25 to about 75° C.; and (e) recovering said copolymer resin, wherein said copolymer resin has a Mz from about 2500 to about 4000 daltons and a polydispersity of about 1.7 to 2.0.

2. The process of claim 1 wherein said unsaturated aliphatic monomer further comprises a $C_4$ to $C_5$ isoolefin.

3. The process of claim 1 wherein said combining of said streams is at a weight ratio of said unsaturated aliphatic monomers to said monovinyl aromatic $C_8$ to $C_{12}$ monomers from about 23/1 to about 25/1, and further wherein said copolymer resin, a ring and ball softening point from about 90° to 100° C.

4. The process of claim 1 wherein said combining of said streams is at a weight ratio of said unsaturated aliphatic monomers to said monovinyl aromatic $C_8$ to $C_{12}$ monomers from about 3/1 to about 5/1, and further wherein said copolymer resin, a ring and ball softening point from about 85° to 95° C.

5. The process of claim/wherein said copolymer resin has a Mz from about 2700 to about 4000 daltons and a polydispersity of about 1.7 to about 2.0.

6. The process of claim 1 wherein said combining of said streams is at a weight ratio of said unsaturated aliphatic monomers to said monovinyl aromatic $C_8$ to $C_{12}$ monomers from about 1.5/1 to about 2.5/1, and further wherein said copolymer resin, a ring and ball softening point from about 85° to 95° C.

7. The process of claim 6 wherein said copolymer resin has a Mz from about 2000 to about 3800 daltons and a polydispersity of about 1.7 to about 2.0.

8. The process of claim 2 wherein said isoolefin is isobutylene.

9. The process of claim 1 wherein a third component comprising isobutylene is provided prior to step (d), said third component being substantially free of said monomers.

10. The process of claim 9 wherein said third component contains at least 99% weight of said isobutylene.

11. The process of claim 1, wherein said monovinyl aromatic $C_8$ to $C_{12}$ monomer is α-methylstyrene.

12. The process of claim 11 wherein said second component contains at least 99% weight of said α-methylstyrene.

13. The process of claim 1 wherein the polymerization is a cationic polymerization comprising from about 0.5 to about 4% weight of a Friedel-Crafts catalyst.

14. The process of claim 13 wherein said Friedel-Crafts catalyst is liquefied $AlCl_3/H_2O$/trimethylbenzene complex.

15. The process of claim 14 wherein said complex has a mole ratio of $AlCl_3$ to $H_2O$ from about 3/1 to about 7/1 and a mole ratio of trimethylbenzene to $H_2O$ from about 3/1 to about 7/1.

* * * * *